(12) United States Patent
Bailey et al.

(10) Patent No.: US 7,280,005 B2
(45) Date of Patent: Oct. 9, 2007

(54) AC COUPLING NETWORK WITH VARIABLE ATTENUATION

(75) Inventors: James A. Bailey, Snowflake, AZ (US); Stephen J. Franck, Felton, CA (US)

(73) Assignee: Agere Systems Inc., Allentown, PA (US)

( * ) Notice: Subject to any disclaimer, the term of this patent is extended or adjusted under 35 U.S.C. 154(b) by 838 days.

(21) Appl. No.: 10/738,810

(22) Filed: Dec. 17, 2003

(65) Prior Publication Data

US 2005/0138436 A1    Jun. 23, 2005

(51) Int. Cl.
*H03H 7/24*    (2006.01)
(52) U.S. Cl. .................. 333/81 R; 333/172; 333/24 R

(58) Field of Classification Search ................ 333/169, 333/172, 174, 81 R, 17.2, 24 C, 24 R; 327/308, 327/309; 330/69, 107, 109
See application file for complete search history.

(56) References Cited

U.S. PATENT DOCUMENTS

2005/0174196 A1*  8/2005  Yang ........................... 333/172
2006/0290426 A1*  12/2006  Chen et al. ................. 330/253

* cited by examiner

*Primary Examiner*—Stephen E. Jones

(57) ABSTRACT

An AC coupling network has (a) a first pair of capacitances C1 connected between the input nodes and the output nodes and (b) a second pair of capacitances C2 cross-connected between the input nodes and the output nodes. The capacitances C1 and C2 are formed by sets of switched capacitors that can be configured to provide the network with different levels of attenuation while maintaining a constant AC coupling pole frequency. In particular, the sets of switched capacitors can be configured to ensure that C1+C2 remains constant, while C1−C2 varies. The present invention enables AC coupling to be implemented without using active devices such as operational amplifiers and/or buffers.

11 Claims, 3 Drawing Sheets

AC COUPLING NETWORK WITH VARIABLE ATTENUATION

BACKGROUND OF THE INVENTION

1. Field of the Invention

The present invention relates to electrical signal processing, and, in particular, to AC coupling networks.

2. Description of the Related Art

An AC coupling network is used to connect two sets of electrical circuitry, where the AC coupling network substantially blocks any DC component in the output signal from the first set of electrical circuitry from passing to the second set of electrical circuitry. In many electrical signal processing applications, it is also desirable for the AC coupling network to apply a variable amount of attenuation to the output signal received from the first set of electrical circuitry before it is passed to the second set, while maintaining a constant pole frequency for the network. Prior-art techniques for creating an AC coupling network with variable attenuation and constant pole frequency employ an active operational amplifier or buffer stage.

FIG. 1 shows a schematic circuit diagram of a prior-art AC coupling network 100 that employs an active operational amplifier A1 having variable capacitors C1 connected at its inputs. In network 100, attenuation is controlled by adjusting the ratio of C2 to C1, while the AC coupling pole frequency $\omega_{APCL}$ is given by Equation (1) as follows:

$$\omega_{ACPL} = \frac{1}{R1 * C2} \quad (1)$$

By varying C1 and keeping C2 constant, the attenuation (or gain) of network 100 can be adjusted without affecting the AC coupling pole frequency.

FIG. 2 shows a schematic circuit diagram of a prior-art AC coupling network 200 that employs active buffer stages A2. In network 200, attenuation is controlled by adjusting the ratio of R4 to R3, while the AC coupling pole frequency $\omega_{APCL}$ is given by Equation (2) as follows:

$$\omega_{ACPL} = \frac{1}{R2 * C3} \quad (2)$$

By varying R4 and keeping R3 constant, the attenuation of network 200 can be adjusted without affecting the AC coupling pole frequency.

Both of these prior-art circuits can provide independent adjustment of attenuation and the AC coupling pole frequency. However, both circuits require active devices in the form of an operational amplifier or a buffer.

SUMMARY OF THE INVENTION

Problems in the prior art are addressed in accordance with the principles of the present invention by an AC coupling network that does not require the use of an active device such as an operational amplifier or a buffer.

In one embodiment, the present invention is circuitry having an AC coupling network. The AC coupling network comprises two input nodes (e.g., 302a and 302b of FIG. 3) and two output nodes (e.g., 304a and 304b). A first resistor (e.g., 310a) is connected between a first output node (e.g., 304a) and a first common-mode voltage node (e.g., Vcm1). A second resistor (e.g., 310b) is connected between a second output node (e.g., 304b) and a second common-mode voltage node (e.g., Vcm2). A first capacitance (e.g., 306a) is connected between a first input node (e.g., 302a) and the first output node. A second capacitance (e.g., 308a) is connected between the first input node and the second output node. A third capacitance (e.g., 308b) is connected between a second input node and the first output node. And a fourth capacitance (e.g., 306b) is connected between the second input node and the second output node.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments.

Figure 1:
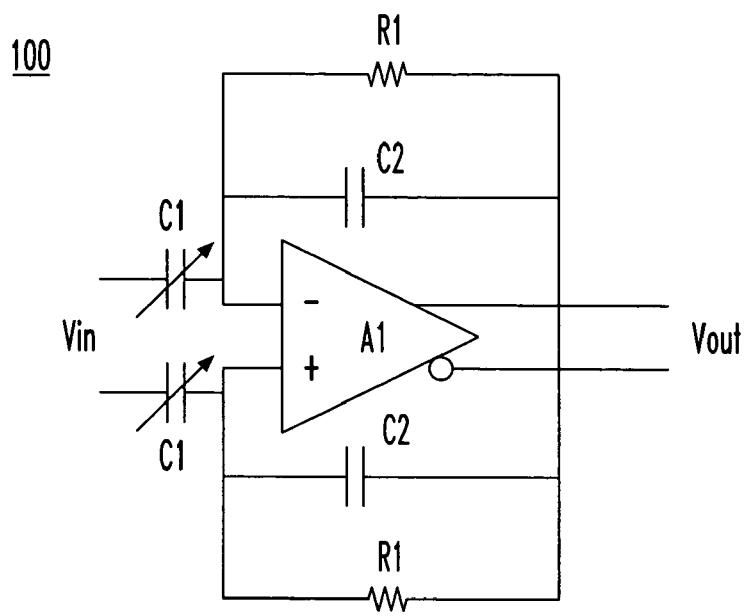
FIG. 1 shows a schematic circuit diagram of a prior-art AC coupling network that employs an active operational amplifier.
Figure 2:
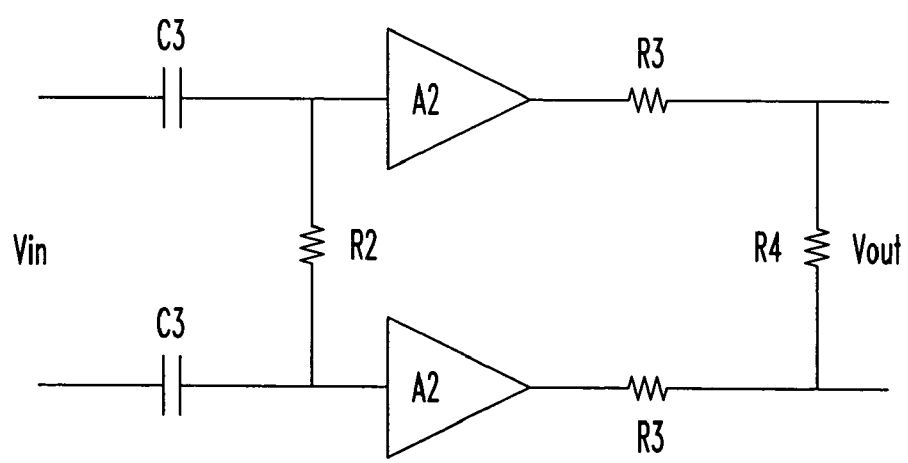
FIG. 2 shows a schematic circuit diagram of a prior-art AC coupling network that employs active buffer stages.
Figure 3:
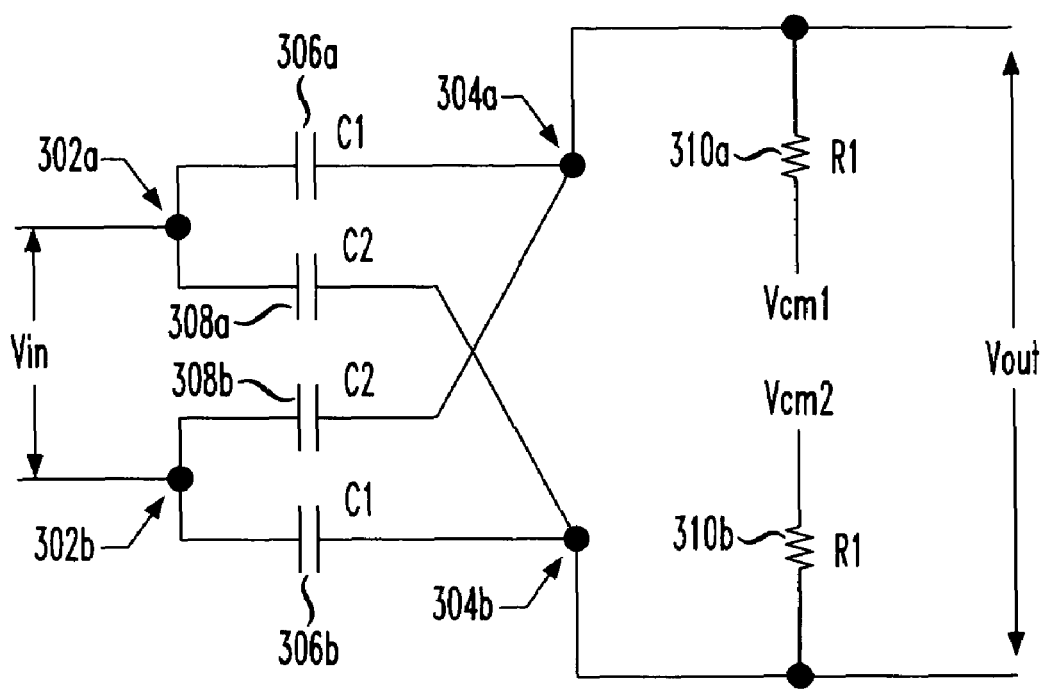
FIG. 3 shows a schematic circuit diagram of an AC coupling network, according to one embodiment of the present invention.

FIG. 3 shows a schematic circuit diagram of an AC coupling network 300, according to one embodiment of the present invention. As shown in FIG. 3, network 300 has two input nodes 302a and 302b and two output nodes 304a and 304b, where the input signal Vin is applied between nodes 302a and 302b and the output signal Vout appears at nodes 304a and 304b. A pair of equivalent capacitors 306a and 306b having substantially identical capacitance C1 are connected between nodes 302a and 304a and between nodes 302b and 304b. Similarly, a pair of equivalent capacitors 308a and 308b having substantially identical capacitance C2 are cross-connected between nodes 302a and 304b and between nodes 302b and 304a. In addition, a pair of equivalent resistors 310a and 310b having substantially identical resistance R1 are connected between node 304a and a first common-mode voltage Vcm1 and between node 304b and a second common-mode voltage Vcm2. (Depending on the application, Vcm1 and Vcm2 could be the same voltage level or they could be different, e.g., in order to inject an offset between the two output nodes to compensate for a corresponding offset in the second set of circuitry connected to output nodes 304a and 304b.)

The gain of network 300 is given by Equation (3) as follows:

$$\text{Gain} = \frac{C1 - C2}{C1 + C2}, \quad (3)$$

while the voltage attenuation (in dB) is given by Equation (4) as follows:

$$\text{Attenuation}_{dB} = 20 * \log \frac{C1 + C2}{C1 - C2}. \quad (4)$$

According to Equation (4), attenuation is 0 dB for C2=0. As C2 increases, attenuation increases, approaching infinity when C2=C1.

The AC coupling pole frequency $\omega_{APCL}$ for network 300 is given by Equation (5) as follows:

$$\omega_{ACPL} = \frac{1}{R1 * (C1 + C2)}. \quad (5)$$

As indicated by Equations (3)-(5), network 300 can provide variable attenuation, while maintaining a constant AC coupling pole frequency by allowing C1-C2 to vary, while keeping C1+C2 constant. In particular, attenuations from 0 dB to approaching infinity can be achieved by varying C2 from 0 to C1, while keeping C1+C2 constant. This means that every increase in the value of C2 is accompanied by a corresponding decrease in the value of C1.

Figure 4:
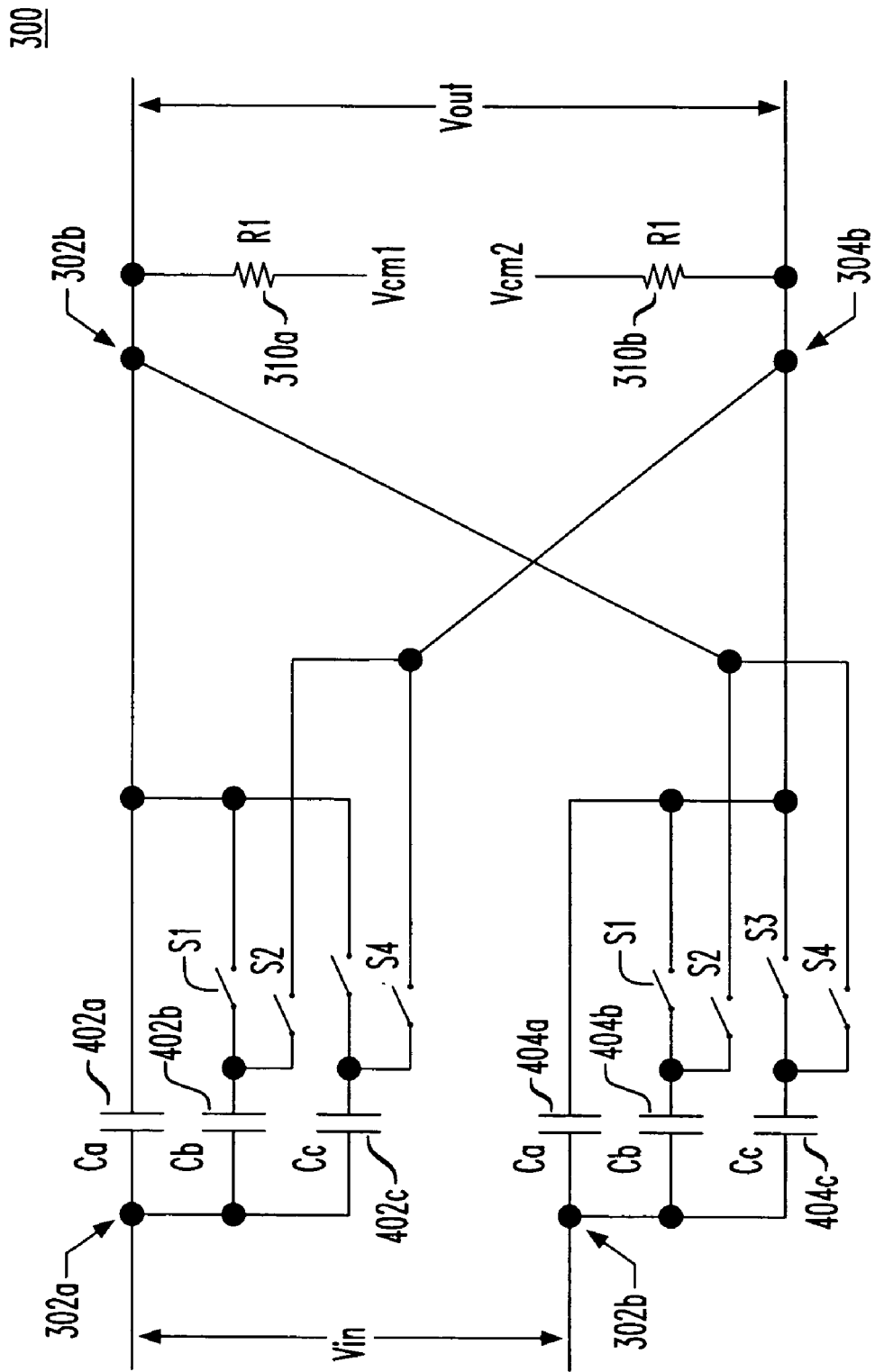
FIG. 4 shows a schematic circuit diagram of one possible implementation of the network of FIG. 3.

FIG. 4 shows a schematic circuit diagram of one possible implementation of network 300 of FIG. 3. According to this implementation, a set of switched capacitors 402a-c having capacitances {Ca, Cb, Cc}, respectively, is connected between input node 302a and output nodes 304a and 304b, and an equivalent set of switched capacitors 404a-c having capacitances {Ca, Cb, Cc}, respectively, is connected between input node 302b and output nodes 304a and 304b.

By closing switches S1 and S3, while keeping switches S2 and S4 open, C1 (i.e., the capacitances connected between nodes 302a and 304a and between nodes 302b and 304b) will be (Ca+Cb+Cc), while C2 (i.e., the capacitances cross-connected between nodes 302a and 304b and between nodes 302b and 304a) will be 0. According to Equation (3), the gain for this configuration of network 300 is given by Equation (6) as follows:

$$\text{Gain} = \frac{Ca + Cb + Cc}{Ca + Cb + Cc} = 1. \quad (6)$$

Similarly, by closing switches S1 and S4, while keeping switches S2 and S3 open, C1 will be Ca+Cb, while C2 will be Cc. In this case, the gain of network 300 is given by Equation (7) as follows:

$$\text{Gain} = \frac{Ca + Cb - Cc}{Ca + Cb + Cc}, \quad (7)$$

which is less than the gain of Equation (6).

Similarly, by closing switches S2 and S3, while keeping switches S1 and S4 open, C1 will be Ca+Cc, while C2 will be Cb. In this case, the gain of network 300 is given by Equation (8) as follows:

$$\text{Gain} = \frac{Ca - Cb + Cc}{Ca + Cb + Cc}, \quad (8)$$

which will be less than the gain of Equation (7) for Cb>Cc.

Lastly, by closing switches S2 and S4, while keeping switches S1 and S3 open, C1 will be Ca, while C2 will be Cb+Cc. In this case, the network gain is given by Equation (9) as follows:

$$\text{Gain} = \frac{Ca - Cb - Cc}{Ca + Cb + Cc}, \quad (9)$$

which is even less than the gain of Equation (8).

For all four of these switch combinations, the AC coupling pole frequency $\omega_{APCL}$ for network 300 is given by Equation (10) as follows:

$$\omega_{ACPL} = \frac{1}{R1 * (Ca + Cb + Cc)}. \quad (10)$$

Thus, the implementation of network 300 shown in FIG. 4 is capable of providing four different levels of attenuation, all of which have the same AC coupling pole frequency.

For example, if the ratio of Ca:Cb:Cc were 3:2:1, then the gain of the configuration corresponding to Equation (6) would be 1, the gain of the configuration corresponding to Equation (7) would be ⅔, the gain of the configuration corresponding to Equation (8) would be ⅓, and the gain of the configuration corresponding to Equation (9) would be 0, where all four configurations would have the same AC coupling pole frequency.

The pole frequency for network 300 can be determined by applying a differential pulse between Vcm1 and Vcm2 and measuring the time constant at Vout. If the capacitors are selected such that Ca=Cb+Cc, then closing switches S2 and S4 (while keeping switches S1 and S3 open) will set C1=C2, which, according to Equation (4), corresponds to a very large attenuation of signal applied at Vin (limited only by capacitor matching), while maintaining the AC coupling pole frequency of Equation (10). This would allow the pole frequency to be determined even while a large signal is present at Vin.

Although the present invention has been described in the context of the implementation shown in FIG. 4 having particular sets of switched capacitors that provide four different attenuation levels, those skilled in the art will understand that the present invention can be implemented using sets of switched capacitors that can, in theory, provide an arbitrary number of different attenuation levels, by designing networks having a different number of switched-capacitor paths with capacitors having different relative capacitances.

The present invention may be implemented as circuit-based processes, including possible implementation as a single integrated circuit (such as an ASIC or an FPGA), a multi-chip module, a single card, or a multi-card circuit pack.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It will be further understood that various changes in the details, materials, and arrangements of the parts which have been described and illustrated in order to explain the nature of this invention may be made by those skilled in the art without departing from the scope of the invention as expressed in the following claims.

We claim:

1. Circuitry having an AC coupling network comprising:
   two input nodes (e.g., 302a and 302b) and two output nodes (e.g., 304a and 304b);
   a first resistor (e.g., 310a) connected between a first one of the two output nodes (e.g., 304a) and a first common-mode voltage node (e.g., Vcm1);
   a second resistor (e.g., 310b) connected between a second one of the two output nodes (e.g., 304b) and a second common-mode voltage node (e.g., Vcm2);
   a first capacitance (e.g., 306a) connected between a first one of the two input nodes (e.g., 302a) and the first output node;
   a second capacitance (e.g., 308a) connected between the first input node and the second output node;
   a third capacitance (e.g., 308b) connected between a second one of the two input nodes (e.g., 302b) and the first output node; and
   a fourth capacitance (e.g., 306b) connected between the second input node and the second output node.

2. The invention of claim 1, wherein the first and second common-mode voltage nodes are tied together.

3. The invention of claim 1, wherein:
   the first and second resistors have substantially identical resistances;
   the values of the first and fourth capacitances are substantially identical; and
   the values of the second and third capacitances are substantially identical.

4. The invention of claim 1, wherein:
   the first and second capacitances are formed from a first plurality of capacitors (e.g., 402a-c) that are adapted to be selectively combined to form two or more different sets of values for the first and second capacitances such that the sum of the first and second capacitances is substantially constant; and
   the third and fourth capacitances are formed from a second plurality of capacitors (e.g., 404a-c) that are adapted to be selectively combined to form two or more different sets of values for the third and fourth capacitances such that the sum of the third and fourth capacitances is substantially constant.

5. The invention of claim 4, wherein:
   the first plurality of capacitors comprise:
      a first capacitor (e.g., 402a) connected between the first input port and the first output port;
      a second capacitor (e.g., 402b) switchably connected between the first input port and one of the first and second output ports; and
      a third capacitor (e.g., 402c) switchably connected between the first input port and one of the first and second output ports; and
   the second plurality of capacitors comprise:
      a fourth capacitor (e.g., 404a) connected between the second input port and the second output port;
      a fifth capacitor (e.g., 404b) switchably connected between the second input port and one of the first and second output ports; and
      a sixth capacitor (e.g., 404c) switchably connected between the second input port and one of the first and second output ports.

6. The invention of claim 5, wherein:
   the second and third capacitors are independently switchable; and
   the fifth and sixth capacitors are independently switchable.

7. The invention of claim 5, wherein:
   the first and fourth capacitors have substantially identical capacitances;
   the second and fifth capacitors have substantially identical capacitances; and
   the third and sixth capacitors have substantially identical capacitances.

8. The invention of claim 4, wherein:
   a first capacitor (e.g., 402a) of the first plurality has a capacitance equivalent to the sum of the other capacitors (e.g., 402b-c) of the first plurality;
   a first capacitor (e.g., 404a) of the second plurality has a capacitance equivalent to the sum of the other capacitors (e.g., 404b-c) of the second plurality;
   the first plurality of capacitors can be configured such that the first capacitance (e.g., C1=Ca) is equivalent to the second capacitance (e.g., C2=Cb+Cc); and
   the second plurality of capacitors can be configured such that the fourth capacitance (e.g., C1=Ca) is equivalent to the third capacitance (e.g., C2=Cb+Cc), such that attenuation of the AC coupling network approaches infinity.

9. The invention of claim 8, wherein a pole frequency for the AC coupling network can be determined by applying a differential pulse between the first and second common-mode voltage nodes and measuring a time constant of an output signal at the first and second output nodes, while a non-zero input signal is applied at the first and second input nodes.

10. The invention of claim 1, wherein the AC coupling network is implemented without any operational amplifiers and without any buffers.

11. The invention of claim 10, wherein the AC coupling network is implemented without any active devices.

* * * * *